United States Patent
Gazave et al.

(10) Patent No.: US 10,578,056 B2
(45) Date of Patent: Mar. 3, 2020

(54) SPACECRAFT NOZZLE COMPRISING AN IMPROVED DEPLOYMENT SYSTEM

(71) Applicant: AIRBUS SAFRAN LAUNCHERS SAS, Paris (FR)

(72) Inventors: Robert Gazave, Panilleuse (FR); Frédérick Millon, Saint Marcel (FR); Jacques Lelong, Puiseux En Bray (FR)

(73) Assignee: ARIANEGROUP SAS, Paris (FR)

( * ) Notice: Subject to any disclaimer, the term of this patent is extended or adjusted under 35 U.S.C. 154(b) by 471 days.

(21) Appl. No.: 15/516,829

(22) PCT Filed: Oct. 2, 2015

(86) PCT No.: PCT/FR2015/052637
§ 371 (c)(1),
(2) Date: Apr. 4, 2017

(87) PCT Pub. No.: WO2016/055722
PCT Pub. Date: Apr. 14, 2016

(65) Prior Publication Data
US 2017/0306889 A1 Oct. 26, 2017

(30) Foreign Application Priority Data

Oct. 6, 2014 (FR) ...................................... 14 59540

(51) Int. Cl.
*F02K 9/97* (2006.01)
*F02K 9/76* (2006.01)
(Continued)

(52) U.S. Cl.
CPC ................ *F02K 9/976* (2013.01); *B64G 1/40* (2013.01); *F02K 9/76* (2013.01); *F02K 9/978* (2013.01);
(Continued)

(58) Field of Classification Search
CPC ............. F02K 9/97; F02K 9/976; F02K 9/978
(Continued)

(56) References Cited

U.S. PATENT DOCUMENTS

| 3,183,664 | A | * | 5/1965 | Divone | ................... | F02K 9/976 239/265.35 |
| 4,638,947 | A | | 1/1987 | Jaqua et al. | | |
| 4,706,886 | A | * | 11/1987 | Jencek | ................... | F02K 9/976 239/265.35 |

FOREIGN PATENT DOCUMENTS

| EP | 0 173 009 A1 | 3/1986 |
| EP | 2 733 340 A1 | 5/2014 |

OTHER PUBLICATIONS

International Search Report in corresponding International Application No. PCT/FR2015/052637, dated Jan. 15, 2016 (4 pages—including English translation).

* cited by examiner

*Primary Examiner* — William H Rodriguez
*Assistant Examiner* — Kyle Robert Thomas
(74) *Attorney, Agent, or Firm* — Bookoff McAndrews, PLLC

(57) ABSTRACT

A nozzle (1) for a space vehicle engine (M), the nozzle comprising a stationary portion (2) and a movable portion (3), the nozzle (1) including a pneumatic deployment system (4) comprising: a deployment actuator (5) for deploying the movable portion (3) of the nozzle (1); a high unlocking actuator (6); a low unlocking actuator (7); and an ejector (41); the deployment system (4) including a feed system (8) configured so as to, sequentially: move the deployment actuator (5) from its support position towards its deployment position; move the high and low unlocking actuators (6, 7)

(Continued)

into their high and low unlocking positions; and actuate the ejector so as to eject the deployment system (4) from the nozzle (1).

6 Claims, 3 Drawing Sheets

(51) Int. Cl.
  *B64G 1/40* (2006.01)
  *F15B 1/02* (2006.01)
  *F15B 11/20* (2006.01)
  *F15B 15/20* (2006.01)
(52) U.S. Cl.
  CPC ................ *F15B 1/02* (2013.01); *F15B 11/20* (2013.01); *F15B 15/20* (2013.01); *F05D 2220/80* (2013.01)
(58) Field of Classification Search
  USPC .................................................. 102/377, 378
  See application file for complete search history.

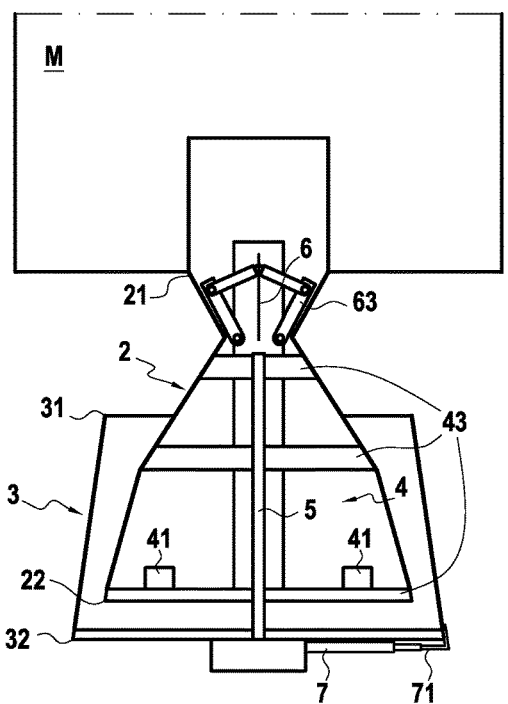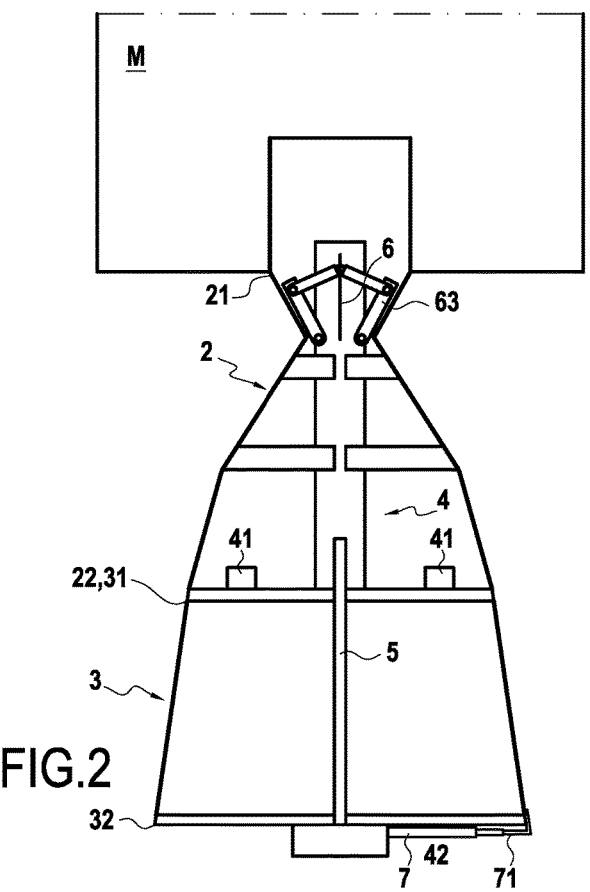

SPACECRAFT NOZZLE COMPRISING AN IMPROVED DEPLOYMENT SYSTEM

CROSS-REFERENCE TO RELATED APPLICATIONS

This application is the U.S. national phase entry under 35 U.S.C. § 371 of International Application No. PCT/FR2015/052637, filed on Oct. 2, 2015, which claims priority to French Patent Application No. 1459540, filed on Oct. 6, 2014, the entireties of which are herein incorporated by reference.

GENERAL TECHNICAL FIELD

The present invention relates to the field of nozzles for the engines of the upper stages of space vehicles.

STATE OF THE ART

An upper stage engine nozzle of a space vehicle commonly presents a problem because of its size, thus requiring a specific space to be dedicated in a lower stage in order to be able to receive the nozzle prior to separation of the upper stage.

Solutions comprising nozzles that are organized in two portions have thus been proposed in order to deal with this problem of size; the nozzle then comprises a portion that is stationary relative to the engine, and a movable portion that is retracted prior to separation of the upper stage, and then deployed and engaged on the stationary portion in order to form the nozzle of the engine.

Patent application FR 14/58184 in the name of the Applicant and as yet unpublished, thus describes a deployment system for a two-portion nozzle.

Nevertheless, known systems used for deploying and engaging the nozzle lead to a structure that is complex, thereby increasing the total weight of the upper stage, and thus penalizing the performance of the upper stage.

Furthermore, the proposed solutions are structurally very complex, which is penalizing in terms of reliability.

The present invention thus seeks to propose a solution that improves these aspects, at least in part.

SUMMARY

To this end, the present invention provides a nozzle for a space vehicle engine, the nozzle comprising a stationary portion that is stationary relative to the engine, and a movable portion that is movable relative to said stationary portion, the stationary portion presenting a free end, the movable portion presenting a proximal end and a distal end, the free end of the stationary portion and the proximal end of the movable portion being adapted to be locked together by engagement, the nozzle having a pneumatic deployment system for deploying the movable portion and arranged in the stationary portion of the nozzle, the pneumatic deployment system comprising:
a deployment actuator adapted to move from a support position in which the movable portion of the nozzle is retracted over the stationary portion of the nozzle, and a deployed position in which the proximal end of the movable portion of the nozzle is engaged with the stationary portion of the nozzle;
a high unlocking actuator adapted to move from a high locking position in which it holds the deployment system in the stationary portion of the nozzle to a high unlocking position in which it disengages the deployment system of the nozzle from the stationary portion of the nozzle;
a low unlocking actuator adapted to move from a low locking position in which it locks the deployment system to the movable portion, and a low unlocking position in which it disengages the deployment system of the nozzle from the movable portion of the nozzle; and
an ejector adapted to exert a thrust force tending to eject the deployment system from the nozzle;
the nozzle being characterized in that the deployment system comprises a pneumatic pressure feed system for actuating the deployment actuator, the high unlocking actuator, and the low unlocking actuator, and the ejector, said feed system being configured in such a manner as to, sequentially:
move the deployment actuator from its support position towards its deployment position;
move the high and low unlocking actuators into their high and low unlocking positions; and
actuate the ejector so as to eject the deployment system from the nozzle.

Typically, the deployment actuator and the high unlocking actuator lie on the same axis.

In a particular embodiment, the feed system feeds pressure to an expansion chamber of the deployment actuator, said expansion chamber of the deployment actuator being connected to an expansion chamber of the high unlocking actuator via a high unlocking rated valve, and to an expansion chamber of the low unlocking actuator via a low unlocking rated valve.

The ejector is then typically connected to the expansion chamber of the high unlocking actuator via an ejection rated valve.

The high unlocking rated valve and the low unlocking rated valve are advantageously configured so that they are opened by:
the resultant of the pressure in the expansion chamber of the deployment actuator; together with
the resultant of the force applied by a rating spring and ambient pressure.

The feed system typically comprises a pneumatic accumulator having a controlled valve for actuating the deployment system.

The invention also provides a space vehicle engine including a nozzle as defined above.

The invention also provides a space vehicle comprising a plurality of superposed stages superposed on a propulsion stage, at least one of said superposed stages including an engine fitted with a nozzle as presented above.

BRIEF DESCRIPTION OF THE FIGURES

Other characteristics, objects, and advantages of the invention appear from the following description, which is purely illustrative and non-limiting, and which should be read with reference to the accompanying figures, in which:

FIGS. 1 to 4 show a nozzle in an aspect of the invention in various steps during its deployment;

DETAILED DESCRIPTION

Figure 3:
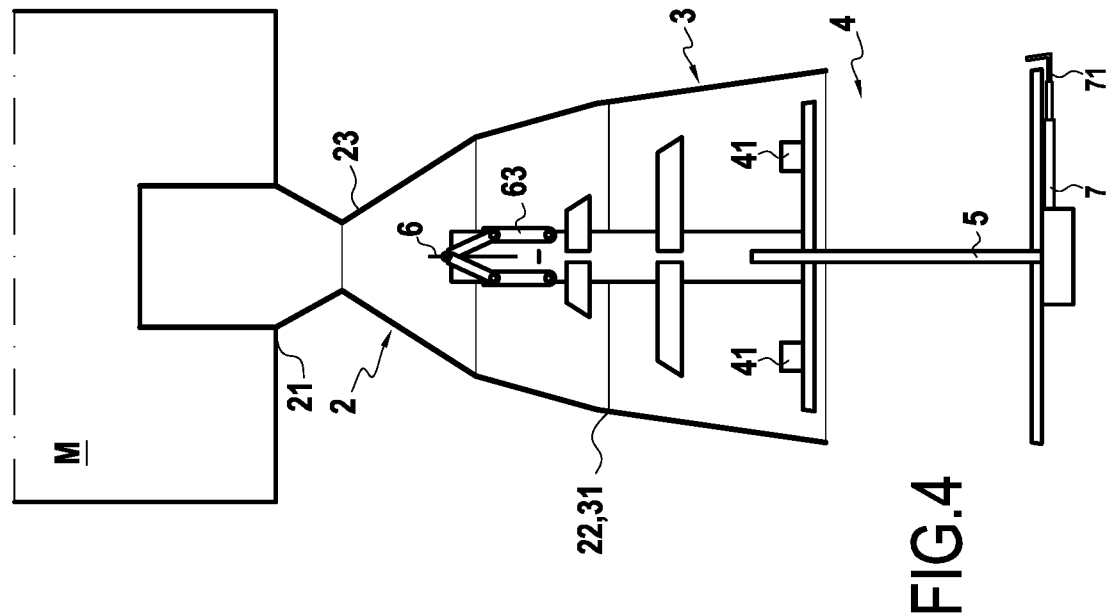

In all of the figures, elements that are common are identified by identical reference numerals.

FIGS. 1 to 4 show a nozzle in an aspect of the invention in several steps during its deployment.

These figures thus show a nozzle 1 of a space vehicle engine M, the nozzle 1 comprising a stationary portion 2 and a movable portion 3 extending along a longitudinal axis Z-Z.

The stationary portion presents a free end 22 and an anchor end 21 whereby it is mounted to be stationary relative to the engine M. The movable portion presents a proximal end 31 and a distal end 32.

Figure 4:
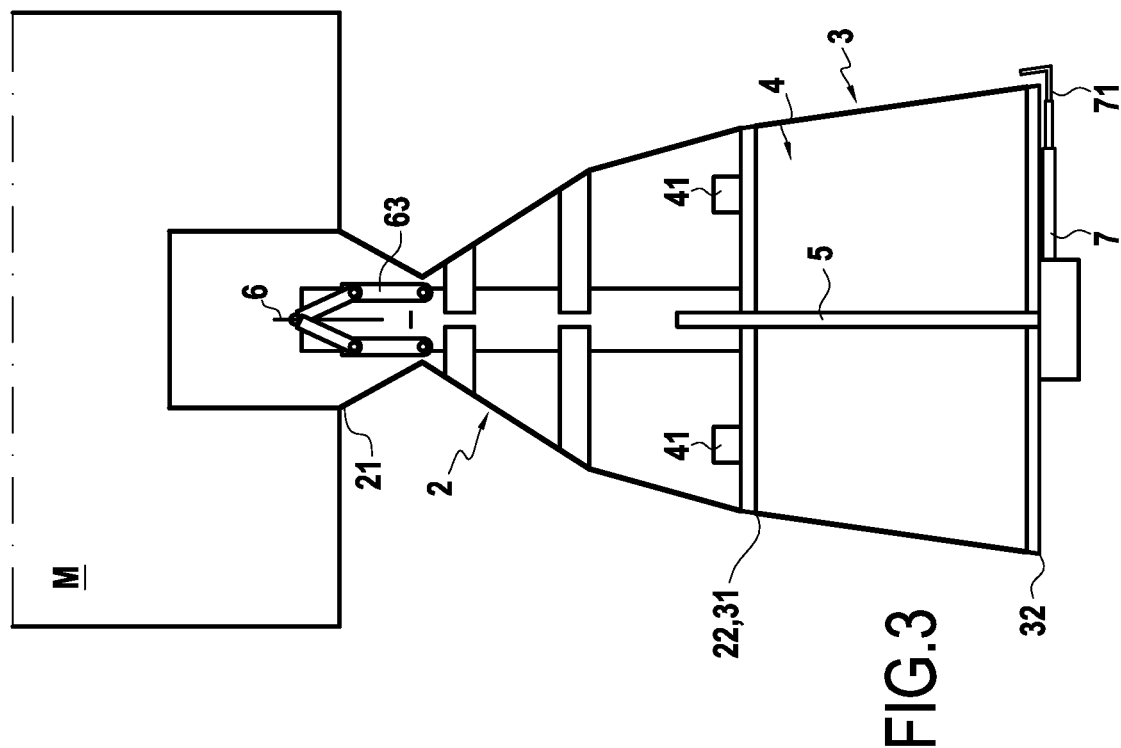

The nozzle 1 is coupled to a deployment system 4 for deploying the movable portion 3, which system is adapted to move the movable portion 3 from a retracted configuration as shown in FIG. 1 to a deployed configuration as shown in FIGS. 2 to 4.

In the retracted configuration, the movable portion 3 of the nozzle 1 is arranged so as to be at least in part around the stationary portion 2 of the nozzle 1. The distal end 32 of the movable portion 3 is then advantageously substantially level with the free end 22 of the stationary portion 2, while the proximal end 31 of the movable portion 3 is then substantially level with the anchor end 21 of the stationary portion 2.

In this configuration, size in the longitudinal direction is reduced, thereby making it possible to minimize the volume needed for housing the nozzle in a lower stage of a space vehicle.

In the deployed configuration, the movable portion 3 of the nozzle 1 is positioned to extend the stationary portion 2, thereby forming a continuous nozzle 1.

By way of example, the proximal end 31 of the movable portion 3 may then be engaged with the free end 22 of the stationary portion 2, e.g. by snap-fastening, so as to ensure cohesion for the nozzle 1.

The movable portion 3 is moved by a pneumatic deployment system 4.

The deployment system 4 as shown is arranged in the stationary portion 2 of the nozzle 1.

The deployment system 4 as shown comprises two actuators: a deployment actuator 5; a high unlocking actuator 6; and a low unlocking actuator 7.

The deployment system 4 has engagement means 63 adapted to act selectively to engage it relative to the stationary portion 2 of the nozzle 1 or to disengage it relative to the stationary portion 2 of the nozzle 1.

The deployment system 4 advantageously also includes at least one centering disk 43, each centering disk presenting an outside diameter corresponding to the inside diameter of a given section of the nozzle 1, and including a central housing for positioning the deployment and high unlocking actuators 5 and 6. These centering disks 43 thus center the deployment system 4 in the nozzle 1.

In the embodiment shown, the engagement means 63 comprise articulated arms that are adapted to act selectively to deploy radially or to fold around the longitudinal axis Z-Z of the nozzle 1 as a function of the position of the high unlocking actuator 6.

In the embodiment shown, the high unlocking actuator 6 is configured to move from a high locking position in which the engagement means are deployed so as to hold the deployment system 4 in the stationary portion 2 of the nozzle 1, to a high unlocking position in which the engagement means are folded so as to disengage the deployment system 4 of the nozzle 1 relative to the stationary portion 2 of the nozzle 1.

When the articulated arms are deployed, they come into abutment against a throat 23 of the stationary portion 2 of the nozzle 1 on one side of the throat 23, the centering disk 43 performing an abutment function on the other side of the throat 23, thus blocking all degrees of freedom of the deployment system 4 to be move relative to the nozzle 1, with the exception of moving in rotation about the longitudinal axis Z-Z of the nozzle 1. Nevertheless, it should be observed that any such movement in rotation about the longitudinal axis Z-Z of the nozzle 1 can be prevented, or at least greatly limited, by calibrating the abutment force of the articulated arms so that the resulting friction acts against movement in rotation of the deployment system 4 about the longitudinal axis Z-Z of the nozzle 1.

The deployment disk is coupled to the deployment actuator 5 and presents an outside diameter that advantageously corresponds to the inside diameter of the distal end 32 of the movable portion 3 of the nozzle 1.

The low unlocking actuator 7 is configured so as to act selectively to lock the deployment system 4 to the movable portion 3 of the nozzle 1, or to disengage the deployment system 4 from the movable portion 3 of the nozzle 1, respectively in a low locking position and in a low unlocking position.

The low unlocking actuator 7 is thus typically coupled to a low locking element 71 that engages with the movable portion 3 of the nozzle 1 when the low unlocking actuator is in the low locking position.

The deployment actuator 5 is configured so that its maximum movement corresponds to the deployed configuration of the movable portion 3 of the nozzle 1, in which position the movable portion 3 is engaged with the stationary portion 2.

The deployment system 4 also typically includes an ejector 41, e.g. ejection nozzles, that may be arranged by way of example on one of the centering disks 43 or on the deployment disk 53. The ejector 41 is arranged so that, in operation, it exerts a thrust force tending to move the deployment system 4 out from the nozzle 1.

The various steps of deploying the nozzle 1 as shown in FIGS. 1 to 4 are described below.

As mentioned above, FIG. 1 shows the movable portion 3 in the retracted configuration, so as to reduce the overall size of the assembly.

The high unlocking actuator 6 then holds the deployment system 4 in position within the nozzle 1, and the deployment actuator 5 is in its short position, in which the movable portion 3 of the nozzle 1 is retracted against the stationary portion 2 of the nozzle 1. The low locking element 71 holds the movable portion 3 engaged with the deployment disk 53.

FIG. 2 shows the movable portion 3 in the deployed configuration. The high unlocking actuator 6 holds the deployment system 4 in position within the nozzle 1, while the deployment actuator 5 is extended until the proximal end 31 of the movable portion 3 engages the free end 22 of the stationary portion 2, corresponding to a deployed position of the deployment actuator 5. The low unlocking actuator 7 holds the movable portion 3 engaged with the deployment disk 53.

FIG. 3 shows the deployment system 4 in the unlocking configuration.

The high unlocking actuator 6 is actuated so as to fold the engagement means 63 around the axis Z-Z of the nozzle 1, and the low unlocking actuator 7 is actuated so as to disengage the movable portion 3 from the deployment disk 53.

The deployment system 4 is thus free to move in translation along the longitudinal axis Z-Z of the nozzle 1 in the direction for leaving the nozzle 1.

FIG. 4 shows the deployment system 4 being ejected from the nozzle 1.

The deployment system 4 is thus ejected from the nozzle 1 so as to avoid obstructing it while the engine M is in operation.

This ejection may be performed by the ejector 41 exerting a thrust force serving to eject the deployment system 4 out from the nozzle 1 so that the deployment system 4 is advantageously ejected from the nozzle 1 prior to igniting the engine M.

The deployment system 4 is actuated by a source of pneumatic energy, thereby enabling deployment to be fast, e.g. using a previously filled accumulator that is provided with a controlled valve.

Numerous types of gas are suitable for such a pneumatic source, in particular: GN2; GHe; compressed air.

Figure 5:
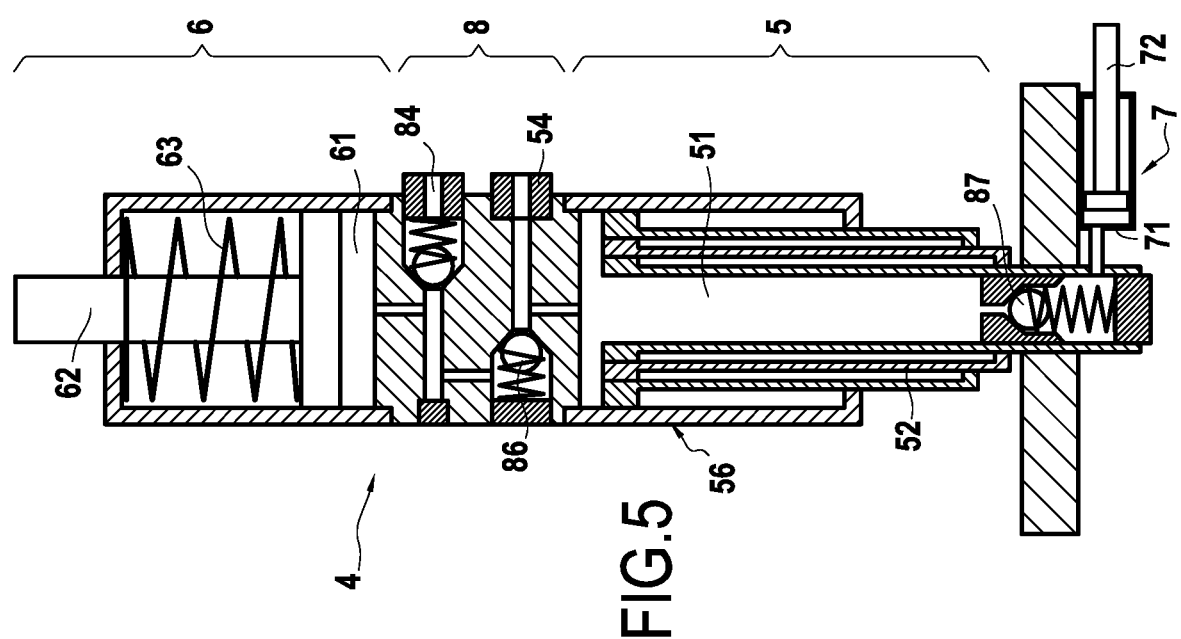
FIG. 5 is a diagram showing a structural example of the deployment system.

FIG. 5 is a diagrammatic fragmentary view showing an example structure for the deployment system 4.

In the example shown, the deployment actuator 5 and the high unlocking actuator 6 lie on the same axis, and are arranged in a common casing 56.

Inside the casing 56, there is defined an expansion chamber 51 for the deployment actuator 5, which actuator has a telescopic rod 52 in the example shown.

The high unlocking actuator comprises an expansion chamber 61, a rod 62, and a return spring 63 opposing the force that results from pressure in the expansion chamber 61.

The deployment system 4 also comprises a feed system 8 arranged between the deployment actuator 5 and the high unlocking actuator 6, which system comprises a feed orifice 54 that is connected to the expansion chamber 51 of the deployment actuator 5 and that serves to feed the deployment system 4, e.g. from a pneumatic accumulator, a pyrotechnic pressure system, or any other suitable source.

The low unlocking actuator 7 comprises an expansion chamber 71, shown in this example as lying outside the casing 56, but which could possibly be incorporated in the casing 56, together with a rod 72.

The expansion chamber 51 of the deployment actuator 5 is connected to the expansion chamber 61 of the high unlocking actuator 6 via a high unlocking rated valve 86, and to the expansion chamber 71 of the low unlocking actuator 7 via a low unlocking rated valve 87.

The high and low unlocking rated valves 86 and 87 are typically configured so that they are opened respectively by possibly identical or distinct high and low unlocking threshold pressure values being established in the expansion chamber 51 of the deployment actuator 5.

The expansion chamber 51 of the deployment actuator 5 is also connected to the ejector 41 via an ejection rated valve 84 configured so that it is opened by an ejection threshold pressure value being established in the expansion chamber 51 of the deployment actuator 5.

The ejection threshold pressure value is strictly greater than the high unlocking threshold pressure value and the low unlocking threshold pressure value so that the ejection rated valve 84 cannot open until after the high and low unlocking rated valves 86 and 87 have opened.

Thus, in operation, feeding pressure to the feed orifice 54 causes the deployment actuator 5 to be deployed, so that it goes from its short position to its extended position, thereby positioning the movable portion 3 of the nozzle 1 so that it extends the stationary portion 2.

Once the deployment actuator 5 is in its extended position, the pressure in the deployment chamber 51 of the deployment actuator 5 rises.

When the pressure in the deployment chamber 51 of the deployment actuator 5 reaches the high and low unlocking threshold pressure values, the high and low unlocking rated valves 86 and 87 open respectively, thereby causing pressure to rise in the expansion chambers 61 and 71 of the high unlocking actuator 6 and of the low unlocking actuator 7, respectively, thus causing the high unlocking actuator 6 to move from its high locking position to its high unlocking position, and causing the low unlocking actuator 7 to move from its low locking position to its low unlocking position, thereby unlocking the deployment system 4 from the nozzle 1.

The high and low unlocking threshold pressure values may be identical or different, such that the high unlocking actuator 6 and the low unlocking actuator 7 are moved either simultaneously or else in succession.

Once the high unlocking actuator 6 and the low unlocking actuator 7 are in their respective high and low unlocking positions, the pressure rise continues in the deployment chambers 51, 61, and 71 respectively of the deployment actuator 5, of the high unlocking actuator 6, and of the low unlocking actuator 7, until it reaches the ejection threshold pressure value, thereby causing the ejection valve 84 to open and putting the ejector 41 into operation so that it ejects the deployment system 4 from the nozzle 1.

Thus, by using a single pressure feed source that feeds the deployment system 4 continuously with pressure, the feed system 8 enables the following operations to be performed in succession: deployment of the nozzle 1; unlocking of the deployment system 4 relative to the nozzle 1; and ejection of the deployment system 4 from the nozzle 1.

The deployment system 4 as proposed in this way enables the nozzle 1 to be deployed in reliable manner, using pneumatic actuators.

The structure of the proposed deployment system 4 also has its components grouped together, thus making it possible both to limit the overall size of the system and also to improve its reliability by limiting assembly operations between the various components of the deployment system 4.

The high and low unlocking rated valves 86 and 87 are typically configured so that they are opened by:
  the resultant of the pressure in the expansion chamber 51 of the deployment actuator 5; together with
  the resultant of the force applied by a rating spring and ambient pressure.

In this way, the high and low unlocking rated valves 86 and 87 remain open when pressure becomes balanced between the expansion chamber 51 of the deployment actuator 5 and the expansion chambers 61 and 71 of the high and low unlocking actuators 6 and 7.

Figure 6:
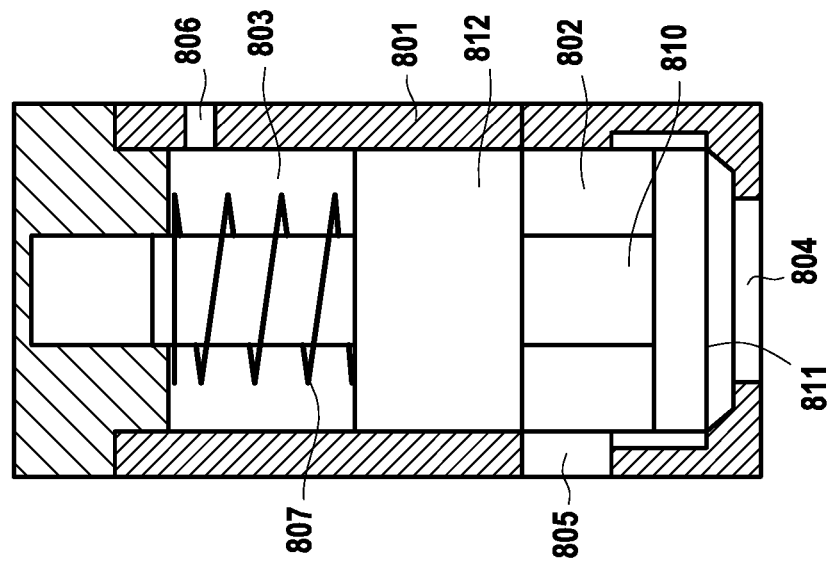
FIG. 6 is a diagram showing an example of a rated valve of FIG. 5.

The high and low unlocking rated valves 86 and 87 thus typically have the structure as shown in FIG. 6, as described below.

FIG. 6 thus shows an example of a rated valve that comprises a casing 801, and a rod 810 having a first piston 811 and a second piston 812, which pistons are arranged in succession on the rod 810.

There are thus defined in the casing 801, both a feed cavity 801 and an open air connection cavity 803, these cavities being isolated from each other by the second piston 812.

The casing 801 has a feed orifice 804 arranged so as to be closed by the first piston 811 under the action of a thrust spring 807, the feed orifice 804 leading into the feed cavity 802 when it is not closed by the first piston 811.

The casing 801 also has an outlet orifice 805 leading into the feed cavity 802, and an open air connection orifice 806 leading into the open air connection cavity 803, so that the open air connection cavity 803 is at ambient pressure.

When the first piston 811 closes the feed orifice 804, pressure applied via the feed orifice 804 applies a thrust force on the first piston 811, against the force applied by the thrust spring 807 plus the resultant of the pressure in the feed cavity 802.

When the pressure applied via the feed orifice 804 exceeds a threshold value, the thrust spring 807 is compressed, thereby moving the rod 810 and thus connecting the feed orifice 804 to the outlet orifice 805 via the feed cavity 802. Pressure then becomes balanced between the feed orifice 804, the outlet orifice 805, and the feed cavity 802.

However, as soon as the first piston 811 no longer closes the feed orifice 804, only the force applied by the thrust spring 807 opposes the resultant of the pressure within the feed cavity 802 applied on the first piston 811 and the second piston 812, insofar as the open air connection cavity 803 is at ambient pressure.

Thus, the first piston 811 no longer closes the feed orifice 804 while pressure is being balanced between the feed orifice 804, the outlet orifice 805, and the feed cavity 802, thus enabling the outlet orifice 805 to be fed continuously with pressure.

By using such rated valves for the high and low unlocking rated valves 86 and 87, the high and low unlocking actuators 6 and 7 are caused to move in continuous and smooth manner.

The ejection valve 84 may also present the structure of a rated valve as shown in FIG. 6, or it may be a conventional valve that opens depending on a pressure difference between upstream and downstream from the valve.

We claim:

1. A nozzle for a space vehicle engine, the nozzle comprising a stationary portion that is stationary relative to the engine, and a movable portion that is movable relative to said stationary portion, the stationary portion presenting a free end, the movable portion presenting a proximal end and a distal end, the free end of the stationary portion and the proximal end of the movable portion being adapted to be locked together by engagement, the nozzle having a pneumatic deployment system for deploying the movable portion and arranged in the stationary portion of the nozzle, the pneumatic deployment system comprising:

a deployment actuator adapted to move from a support position in which the movable portion of the nozzle is retracted over the stationary portion of the nozzle, and a deployed position in which the proximal end of the movable portion of the nozzle is engaged with the stationary portion of the nozzle;

a high unlocking actuator adapted to move from a high locking position in which it holds the pneumatic deployment system in the stationary portion of the nozzle to a high unlocking position in which it disengages the pneumatic deployment system of the nozzle from the stationary portion of the nozzle;

a low unlocking actuator adapted to move from a low locking position in which it locks the pneumatic deployment system to the movable portion, and a low unlocking position in which it disengages the pneumatic deployment system of the nozzle from the movable portion of the nozzle; and an ejector adapted to exert a thrust force tending to eject the pneumatic deployment system from the nozzle;

the nozzle being characterized in that the pneumatic deployment system comprises a pneumatic pressure feed system for actuating the deployment actuator, the high unlocking actuator, and the low unlocking actuator, and the ejector, said feed system being configured in such a manner as to, sequentially:

move the deployment actuator from its support position towards its deployment position;

move the high and low unlocking actuators into their high and low unlocking positions; and actuate the ejector so as to eject the pneumatic deployment system from the nozzle;

wherein the pneumatic pressure feed system feeds pressure to an expansion chamber of the deployment actuator, said expansion chamber of the deployment actuator being connected to an expansion chamber of the high unlocking actuator via a high unlocking rated valve, and to an expansion chamber of the low unlocking actuator via a low unlocking rated valve; and wherein the ejector is connected to the expansion chamber of the high unlocking actuator via an ejection rated valve.

2. The nozzle according to claim 1, wherein the deployment actuator and high unlocking actuator lie on the same axis.

3. The nozzle according to claim 1, wherein the high unlocking rated valve and the low unlocking rated valve are configured so that they are opened by:

the resultant of the pressure in the expansion chamber of the deployment actuator; together with the resultant of the force applied by a rating spring and ambient pressure.

4. The according to claim 1, wherein the pneumatic pressure feed system comprises a pneumatic accumulator having a controlled valve for actuating the pneumatic deployment system.

5. A space vehicle engine have the nozzle according to claim 1.

6. A space vehicle comprising a plurality of superposed stages superposed on a propulsion stage, at least one of said superposed stages including an engine fitted with the nozzle according to claim 1.

* * * * *